Patented May 10, 1932

1,857,600

UNITED STATES PATENT OFFICE

GEORG MASING, OF BERLIN, GERMANY, ASSIGNOR TO SIEMENS & HALSKE, AKTIEN-GESELLSCHAFT, OF SIEMENSSTADT NEAR BERLIN, GERMANY, A CORPORATION OF GERMANY

MANUFACTURE OF METAL COVERED COPPER WIRES

No Drawing. Application filed April 6, 1929, Serial No. 353,245, and in Germany March 3, 1928.

My invention relates to improvements in the manufacture of metal covered copper wires.

It is well known that for the manufacture of Krarup wires copper wires are covered with magnetic materials, such as iron or iron alloys. In order to restore the magnetic properties of the covering wire which have deteriorated during its application to the copper wire, Krarup wire is subsequently heated to about red heat. It has been observed that the copper wire becomes brittle, if a heating temperature of 1000° F. (550° C.) is exceeded. If, on the other hand the heating temperature is confined to 1000° F. (550° C.), it is impossible to set up the most favorable magnetic properties in the iron covering, wrapping or braiding.

Extensive researches and tests have shown that the brittleness of the copper is avoided if the copper wire is manufactured of copper deoxidized in the melted state. As a deoxidizer calcium is amongst others particularly suitable, as it does not decrease the conductivity of the copper.

I claim as my invention:

1. As a new article of commerce, a heat treated metal covered wire having a copper conductor composed of copper completely deoxidized in the melted state.

2. As a new article of commerce, a heat treated metal covered wire having a copper conductor composed of copper completely deoxidized by means of calcium.

3. As a new article of commerce, a heat treated ferro-magnetic metal covered copper wire, whose copper portion consists of copper completely deoxidized in the melted state.

4. As a new article of commerce, a heat treated iron covered copper wire, whose copper portion consists of copper completely deoxidized in the melted state.

In testimony whereof I affix my signature.

GEORG MASING.

DISCLAIMER 1,857,600.—*Georg Masing*, Berlin, Germany. MANUFACTURE OF METAL COVERED COPPER WIRES. Patent dated May 10, 1932. Disclaimer filed July 10, 1935, by the assignee, *Siemens & Halske, Aktiengesellschaft*.

Hereby enter this disclaimer to that part of the claim in said specification which is in the following words, to wit:

"1. As a new article of commerce, a heat treated metal covered wire having a copper conductor composed of copper completely deoxidized in the melted state."

"3. As a new article of commerce, a heat treated ferromagnetic metal covered copper wire, whose copper portion consists of copper completely deoxidized in the melted state.

"4. As a new article of commerce, a heat treated iron covered copper wire, whose copper portion consists of copper completely deoxidized in the melted state."

[*Official Gazette July 30, 1935.*]